(12) United States Patent
Cowan et al.

(10) Patent No.: US 12,225,895 B2
(45) Date of Patent: Feb. 18, 2025

(54) WEED CONTROL

(71) Applicant: WEEDING TECHNOLOGIES LIMITED, London (GB)

(72) Inventors: Joe Cowan, Stafford (GB); Lee Smith, Stafford (GB); Franck Balducchi, London (GB)

(73) Assignee: WEEDING TECHNOLOGIES LIMITED (GB)

( * ) Notice: Subject to any disclaimer, the term of this patent is extended or adjusted under 35 U.S.C. 154(b) by 884 days.

(21) Appl. No.: 16/771,131

(22) PCT Filed: Nov. 28, 2017

(86) PCT No.: PCT/GB2017/053587
§ 371 (c)(1),
(2) Date: Jun. 9, 2020

(87) PCT Pub. No.: WO2018/100362
PCT Pub. Date: Jun. 7, 2018

(65) Prior Publication Data
US 2021/0169063 A1 Jun. 10, 2021

(30) Foreign Application Priority Data
Nov. 29, 2016 (GB) ...................................... 1620238

(51) Int. Cl.
*A01M 21/04* (2006.01)
*B05B 7/00* (2006.01)

(52) U.S. Cl.
CPC ............. *A01M 21/043* (2013.01); *B05B 7/00* (2013.01); *B05B 7/0018* (2013.01)

(58) Field of Classification Search
CPC ....... A01M 21/043; B05B 7/00; B05B 7/0018
(Continued)

(56) References Cited

U.S. PATENT DOCUMENTS 3,563,461 A * 2/1971 Cole, Jr. .............. A01G 13/065
47/2
4,044,923 A * 8/1977 Gardner ............. B65D 51/1644
222/211
(Continued)

FOREIGN PATENT DOCUMENTS

EP 1450603 9/2004
NL 1018458 1/2003
(Continued)

OTHER PUBLICATIONS

Great Britain Search Report dated May 17, 2017 issued in corresponding Great Britain Application No. 1620238.4.
(Continued)

*Primary Examiner* — Qingzhang Zhou
*Assistant Examiner* — Kevin Edward Schwartz
(74) *Attorney, Agent, or Firm* — Onello & Mello, LLP

(57) ABSTRACT

Vegetation such as a weed (45) may be controlled by generating a foam comprising air and an aqueous solution comprising a surfactant; dispensing the foam so as to coat at least a base part of the weed that is to be controlled; and then injecting hot water into the foam (46) so as to contact the weed (45) below or within the coating of foam (46) The hot water causes the weed (45) to wilt and die, while the foam (46) suppresses heat loss from the hot water. The method may be carried out using a portable tool (10) which includes an air blower (14), a container (20) of a concentrate for the aqueous solution, a foam-generating tube (24) ending in an open-topped chute (26). The hot water may be provided through a flexible hose (22) from an external boiler (23), and after being used to produce the foam (46), the hot water be sprayed onto the top end of the chute (26).

8 Claims, 3 Drawing Sheets

(58) Field of Classification Search
USPC .......................................................... 239/343
See application file for complete search history.

(56) References Cited

U.S. PATENT DOCUMENTS

| | | | | |
|---|---|---|---|---|
| 4,946,081 | A * | 8/1990 | Jacobson | ............... B65D 35/38 |
| | | | | 401/266 |
| 5,409,166 | A * | 4/1995 | Gunzel, Jr. | ........... B05B 7/1422 |
| | | | | 239/654 |
| 5,433,758 | A | 7/1995 | Thompson et al. | |
| 5,575,111 | A | 11/1996 | Rajamannan | |
| 5,622,123 | A * | 4/1997 | Rajamannan | ......... A01M 21/04 |
| | | | | 111/120 |
| 5,749,498 | A * | 5/1998 | Lavoie | .............. B05C 17/005 |
| | | | | 222/326 |
| 6,029,589 | A * | 2/2000 | Simpson | ............... A01M 21/04 |
| | | | | 111/7.2 |
| 6,505,437 | B1 * | 1/2003 | Johnstone | ............. A01M 21/04 |
| | | | | 47/1.7 |
| 9,426,974 | B2 * | 8/2016 | Hobbs | .................. A01M 21/043 |
| 9,504,242 | B2 * | 11/2016 | Hobbs | .................. A01M 7/0042 |
| 2003/0136048 | A1 * | 7/2003 | Newson | ................. A01G 11/00 |
| | | | | 47/1.3 |
| 2005/0005509 | A1 * | 1/2005 | Tindall | .................. A01N 25/16 |
| | | | | 47/1.01 R |
| 2005/0116071 | A1 | 6/2005 | Rajamannan | |
| 2007/0008814 | A1 * | 1/2007 | Johnson | ................ B28C 5/4248 |
| | | | | 366/68 |
| 2010/0044469 | A1 * | 2/2010 | Ballu | .................... B05B 11/307 |
| | | | | 239/270 |
| 2010/0278958 | A1 * | 11/2010 | Chamberlain | .......... E04F 21/30 |
| | | | | 425/458 |
| 2016/0044909 | A1 * | 2/2016 | Lampe | .................. A01M 21/04 |
| | | | | 222/190 |
| 2017/0202203 | A1 * | 7/2017 | Swan | .................... A01M 21/04 |
| 2019/0217329 | A1 * | 7/2019 | Kenney | ............... E04F 21/1652 |

FOREIGN PATENT DOCUMENTS

| | | |
|---|---|---|
| NZ | 240568 | 12/1994 |
| WO | 0207513 | 1/2002 |
| WO | 03026414 A1 | 4/2003 |

OTHER PUBLICATIONS

International Search Report and Written Opinion dated Feb. 26, 2018 issued in corresponding International Application No. PCT/GB2017/053587.

* cited by examiner

WEED CONTROL

FIELD OF THE INVENTION

The present invention relates to a method of controlling vegetation and to an apparatus for performing the method.

BACKGROUND OF THE INVENTION

Conventionally, vegetation such as weeds is controlled either by physical removal, such as hand weeding, or by the use of herbicides. Hand weeding can be very hard work; but plants are becoming increasingly resistant to herbicides. In addition, there is increasing public resistance to the use of chemicals in the environment, and legislative changes to reduce use of toxic chemicals as herbicides. Therefore there is an interest in methods of controlling vegetation which do not use synthetic chemicals and which avoid hand weeding.

Thermal methods have been suggested for weed control. A variety of methods have been used to provide heat to weeds, for example, hot water, steam, hot air, flames and hot foam. These methods can overcome some of the disadvantages of herbicides such as spray drift and soil or groundwater pollution. WO 02/07513 (Waipuna International) describes a process for weed control by application of hot foam, in which hot liquid containing a foaming agent is supplied to an applicator head, and air is supplied from a blower through a hose, so a hot foam is created. NL 1018458 (Waterkracht BV) describes a process in which hot water is sprayed onto weeds, and an insulating layer of foam is then deposited onto the weeds that have been sprayed.

The present invention aims to provide a more effective weed-killing method and apparatus, which overcomes problems that have been found to occur in the production of a hot foam layer.

The present invention provides a method of controlling vegetation comprising the steps of:
  generating a foam comprising air and an aqueous solution comprising a surfactant;
  dispensing the foam so as to coat the vegetation that is to be controlled; and
  then injecting hot water into the foam so as to contact the vegetation below or within the coating of foam.

SUMMARY OF THE INVENTION

The hot water causes the vegetation to wilt and die, while the foam suppresses heat loss from the hot water. The foam may be generated and dispensed at a temperature above ambient temperature. Foam at an elevated temperature has the benefit that when the hot water is injected, it enters an environment that has already been heated up, so reducing the loss of thermal energy from the injected hot water. More of the thermal energy from the injected hot water is therefore available for raising the temperature of the vegetation, so the method is more effective at controlling the vegetation, for example when killing weeds. Preferably the foam is arranged to coat and surround at least a base part of the vegetation, so the hot water is injected adjacent to a portion of the vegetation that is near the ground.

The hot water may be at a temperature of at least 60° C., or at least 75° C., and may be at least 90° C., for example 95° C. or more. When vegetation is raised to such a high temperature, the proteins within the cells are denatured, and this kills the portions of the vegetation that are contacted by the hot water. When treating weeds, in some cases the result is that the weed will wilt and die. In some cases the portions of the weeds that are above the ground wilt and die, but new shoots may subsequently grow up from the roots, so that it may be necessary to repeat the weed-killing treatment.

By way of example the aqueous solution from which the foam is generated may include a small proportion of xanthan gum, which may assist in increasing tackiness, so the resulting foam tends to stick to the vegetation; a glutamic acid-based chelating agent, to sequester any polyvalent ions such as calcium ions which might otherwise inhibit foam formation; and a mixture of two different alkyl polyglucosides (APG), for example a shorter chain length APG, C8-C10, to efficiently wet the surface; and an APG of a wider range of chain lengths, for example C8-C14, to enhance foam formation. APGs are well known as surfactants, aqueous solutions of APGs forming foams; such APGs are available for example from Cognis™.

It will be appreciated that all of these compounds for use in the aqueous solution are naturally-occurring compounds, or are based on naturally-occurring compounds; and that they are readily broken down by microorganisms in the environment, so they do not cause contamination. The components of the aqueous solution may be provided in the form of a concentrate, and this concentrate then be diluted with water, for example hot water, during the course of the foam formation.

In a second aspect the invention provides an apparatus for controlling vegetation comprising a foam-generating device for generating a foam that comprises air and an aqueous solution comprising a surfactant; a foam-dispensing duct for dispensing the foam so as to enable a coating of foam to be deposited on the vegetation; and a nozzle for injecting hot water into the foam so as to contact the vegetation below or within the coating of foam, and means to supply hot water to the nozzle.

The apparatus may include means to delay the injection of hot water through the nozzle until after the foam has been dispensed from the foam-dispensing duct.

The nozzle for injecting hot water may be arranged to spray the hot water over surfaces of the foam-dispensing duct, for example by injecting the hot water at the top of a chute at an end of the foam-dispensing duct. It has been found that the foam tends to stick not only to the surfaces of the vegetation but also to surfaces of the foam-dispensing duct; and injecting the hot water in such a way as to spray the hot water over the surfaces of the duct tends to remove any remaining foam from those surfaces. The hot water may be sprayed through a nozzle shaped to form a water blade, that is to say a jet of water that is wide but thin, as this is particularly effective at removing all traces of the foam material from the foam-dispensing duct.

The foam-generating device may comprise an air blower connected to an air duct, with a liquid spray nozzle within the air duct. A flow duct to carry water leads via a venturi constriction to the spray nozzle, and a second duct communicates between a vessel to contain a concentrate for the aqueous solution and the venturi constriction, so that water flowing through the flow duct causes the concentrate to be sucked into the water flow at the venturi constriction, so that a diluted aqueous solution is then sprayed through the spray nozzle to mix with the airflow and form foam. The foam formation may be enhanced by providing a mesh barrier that surrounds the spray nozzle, so that the sprayed aqueous solution and the air then pass through the mesh barrier.

An alternative foam-generating device comprises an air blower connected through an air duct to a porous block, the porous block being arranged to be immersed in the aqueous solution in an open-topped vessel. In operation air from the air blower emerges from the porous block as multiple small bubbles, which form foam at the surface of the aqueous solution within the vessel. The continuous flow of air therefore continuously forms foam, and this foam therefore flows out of the vessel, so it reaches the foam-dispensing duct.

In each case it will be appreciated that the quantity of foam that can be generated is constrained by the quantity of the concentrate that is available, and in some cases may be constrained by the airflow available. The volume of foam is considerably greater than the initial volume of the concentrate, and indeed is greater than the volume of the aqueous solution that is formed from the concentrate. For example the volume of foam may be between 20 and 250 times greater than the volume of the aqueous solution, as the foam may for example be between 0.4% and 5% aqueous solution (by volume), although preferably no more than 2% aqueous solution (by volume).

BRIEF DESCRIPTION OF THE DRAWING FIGURES

The invention will now be further and more particularly described, by way of example only, and with reference to the accompanying drawings in which.

DETAILED DESCRIPTION OF THE INVENTION

Figure 1:
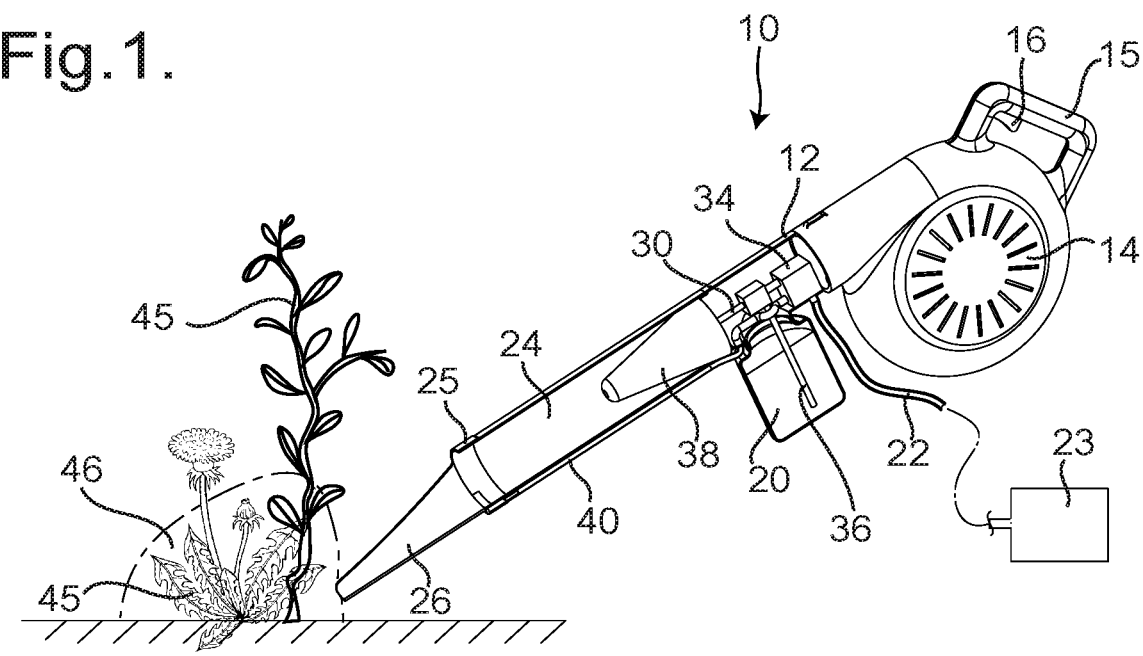
FIG. 1 shows a perspective view of a weed control apparatus of the invention, partly cut away.

Referring to FIG. 1, a hand-held weed control apparatus 10 comprises a generally cylindrical body 12 at one end of which is an air blower 14, and a protruding handle 15 which includes a trigger 16. The air blower 14 may be powered by a battery 18 (shown in FIG. 2), or may be mains-powered, the apparatus 10 being provided with a flexible lead (not shown). At an intermediate position along the cylindrical body 12 a bottle or jar 20 is attached by a screw fitting to the underside of the cylindrical body 12; and also a flexible hose 22 to carry hot water from an external heater or boiler 23 (shown schematically) is connected to the underside of the cylindrical body 12. The opposite end of the cylindrical body 12 defines an open-ended tube 24. An annular nozzle structure 25 is mounted at the open end of the tube 24, from which projects an open-topped chute 26. The type of external heater or boiler 23 is not critical, as the heater or boiler 23 may produce heat electrically, or using a gas or liquid-fuel burner, for example.

Figure 2:
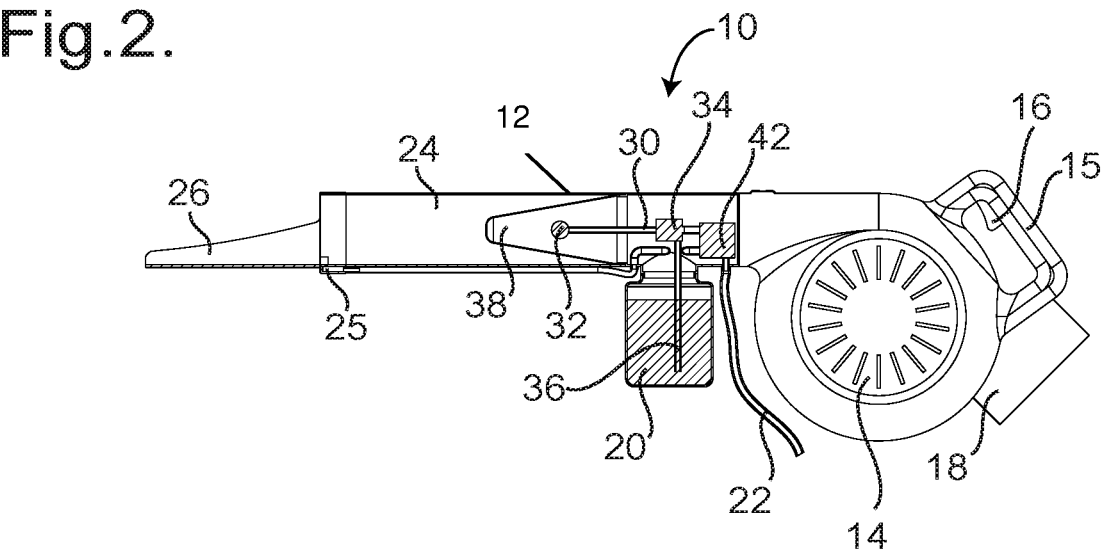
FIG. 2 shows a view, partly in longitudinal section, of the weed control apparatus of FIG. 1.

Referring also to FIG. 2, the air blower 14 when energised causes air to flow along inside the cylindrical body 12 and the open-ended tube 24, so that it passes over a mist spray nozzle 32 (shown in FIG. 2). The flexible hose 22 connects to a solenoid-controlled valve 42 within the cylindrical body 12, and a duct 30 leads from the control valve 42 to the mist spray nozzle 32, the duct 30 including a venturi constriction 34. The bottle or jar 20 contains a concentrate containing a foaming agent; and a duct 36 extends from near the bottom of the bottle or jar 20 to the duct 30 at the venturi constriction 34. Consequently the water flow along the duct 30 sucks the concentrate from the bottle or jar 20 into the water flow, so forming an aqueous solution which is sprayed out of the mist spray nozzle 32. The mist spray nozzle 32 is within a conical mesh barrier 38. The effect of the air flowing over the mist spray nozzle 32 and through the conical mesh barrier 38, while the aqueous solution is sprayed from the spray nozzle 32, is that foam fills the end of the open-ended tube 24 and flows down the open-topped chute 26.

In addition, a pipe 40 leads from the solenoid-controlled valve 42 to the annular nozzle structure 25. The solenoid-controlled valve 42 is controlled by a microprocessor or a timer (not shown) that may be within the cylindrical body 12. The annular nozzle structure 25 is arranged to allow water to emerge as a blade or flat jet from the upper part of the annular nozzle structure 25 so as to impact on the lower part of the annular nozzle structure 25 and on the top end of the open-topped chute 26.

In operation the end of the chute 26 is aimed at a weed 45, near the base of the weed 45 (two weeds are indicated schematically in FIG. 1) and the trigger 16 is pulled. This initiates operation of the air blower 14, so as described above foam emerges from the open-ended tube 24 and flows down the open-topped chute 26 to cover the surfaces of the weed 45; the deposited foam 46 is indicated by a broken line in FIG. 1, and it will be appreciated that the foam 46 is partly on the ground around the weed 45 and partly on at least the lower parts of the weed 45. After a predetermined time period set by the microprocessor or timer, the air blower 14 stops, so ceasing the supply of foam, and the timer operates the solenoid-controlled valve 42 so that the hot water from the flexible hose 22 flows through the pipe 40 to the annular nozzle structure 25, so it sprays onto the upper surface of the open-topped chute 26. The hot water consequently runs down the chute 26 and into the foam 46 covering the weed 45. The hot water is therefore dispensed at the base of the weed 45. Consequently the hot water comes into contact with the weed 45 within or beneath the foam 46. This causes the tissues of the weed 45 to wilt and die; with a large weed the immediate effect is to kill the portion of the weed closest to the ground, and the remainder of the weed dies as a consequence.

In a modification the bottle or jar 20 may also include an electrical heater (not shown) to raise the temperature of the aqueous solution. This has the effect that the foam is formed at a temperature above ambient temperature, and so the foam 46 deposited on and around the weed 45 is above ambient temperature. When the hot water is then injected near the base of the weed, there is less loss of heat to the surrounding foam 46 and so more heat available for killing the weed 45.

The foam 46 tends to stick to the surfaces of the weed 45, as is desirable; but in addition it tends to stick to the surfaces of the open-topped chute 26. Spraying the hot water through the annular nozzle structure 25 onto the upper surface of the open-topped chute 26 has been found to be effective at removing foam from these surfaces.

Figure 3:
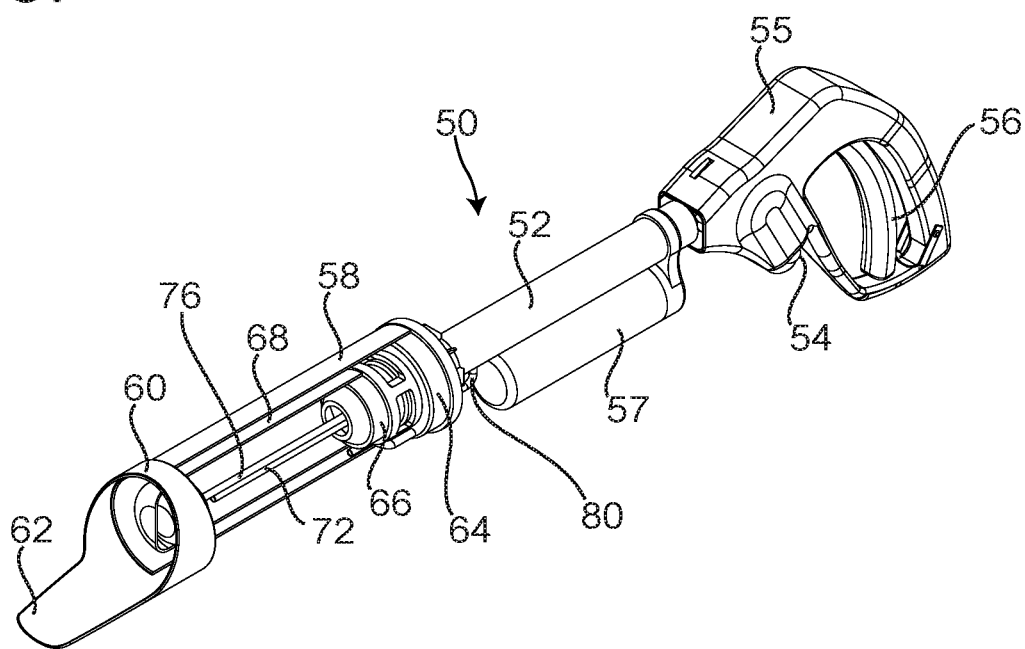
FIG. 3 shows a perspective view of an alternative weed control apparatus with a handle, partly cut away.

Referring now to FIG. 3, an alternative hand-held weed control apparatus 50 is shown in perspective, and partly cut away. The apparatus 50 comprises a generally cylindrical body 52 at one end of which is a protruding handle 55 which includes a trigger 56. A multi-socket 54 projects below the handle 55, having inlets 54a, 54b (see FIG. 5) to which hoses carrying compressed air and pressurised hot water would be connected in operation. Mounted on the underside of the cylindrical body 52 is a bottle 57 which in use contains a concentrated solution of foaming agent. From the opposite end of the cylindrical body 52 projects an open-ended tube 58 of larger diameter (shown cut away), and an annular nozzle structure 60 may be provided at the open end of the tube 58, from which projects an open-topped chute 62.

Figure 4:
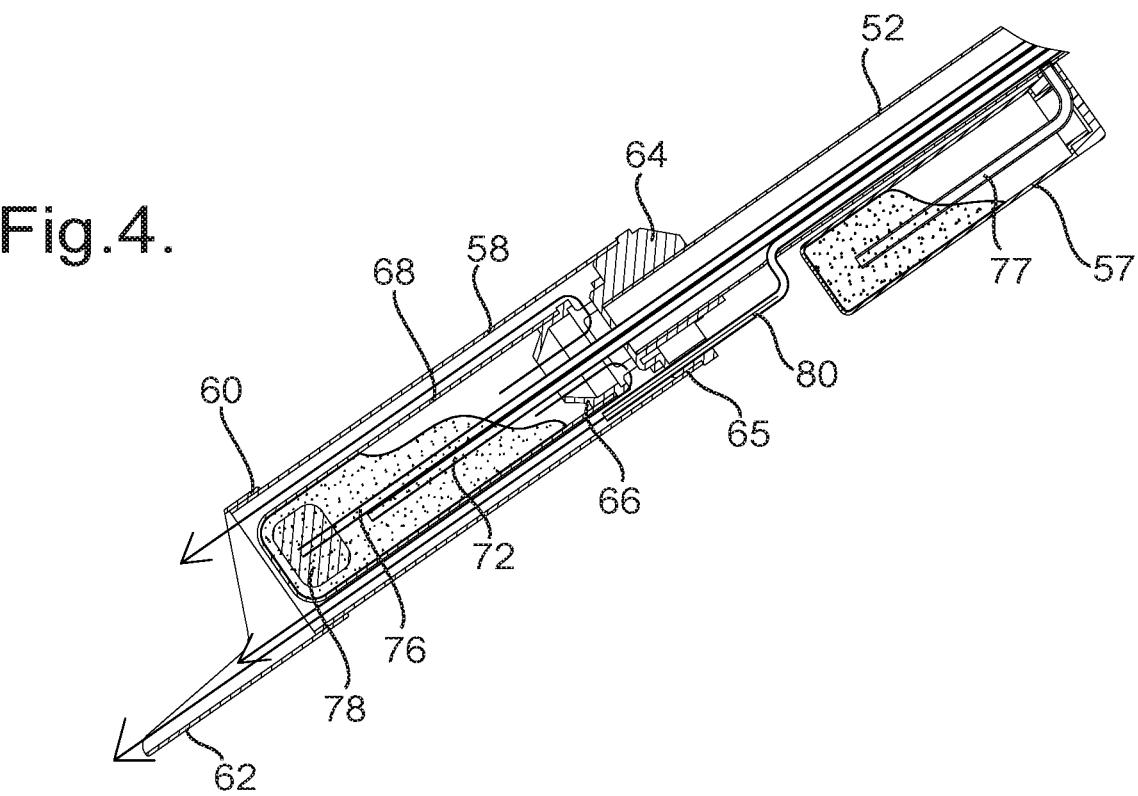
FIG. 4 shows a sectional view of part of the weed control apparatus of FIG. 3, apart from the handle.

Referring also to FIG. 4, an annular end fitting 64 of the cylindrical body 52 defines an external screw thread 65 whereby the tube 58 is connected to the cylindrical body 52. A short tubular spider 66 attaches to the end of the annular end fitting 64 within the tube 58, the spider 66 including legs to space it away from the end of the annular end fitting 64, and the tubular spider 66 also defines an external screw thread. A foam-production vessel 68 locates concentrically within the tube 58, being attached at its top end to the external screw thread of the tubular spider 66, and being closed at its bottom end, so there is an annular gap between the outside of the foam-production vessel 68 and the inside of the tube 58. (It will be appreciated that the tube 58 may instead be connected to the cylindrical body 52 using a different mechanism for example a snap fit; and that the foam-production vessel 68 may be attached to the tubular spider 66 using a different mechanism, for example a snap fit.)

The trigger 56 controls mechanical valves 70 (shown in FIG. 5) within the protruding handle 55, to control the flow of compressed air and pressurised hot water supplied through the inlets 54a and 54b. Hot water is supplied to a tube 72 that includes a restriction or venturi (not shown), and the tube 72 projects through the tubular spider 66 into the foam-production vessel 68. A tube 77 links the contents of the bottle 57 to the restriction or venturi in the tube 72. The compressed air from the inlet 54a is supplied to a tube 76 that extends through the tubular spider 66 to near the bottom of the foam-production vessel 68, and on the end of the tube 76 is mounted a porous stone block 78 (see FIG. 4).

The hot water from the inlet 54b is supplied to a tube 80 that extends down into the open-ended tube 58. The tube 80 may have an open end near the top of the tube 58, as shown, the open end acting as a nozzle, or alternatively the tube 80 may feed the hot water into the annular nozzle structure 60, if this is provided.

In operation, hot water from the inlet 54c is supplied through the tube 72, so concentrate from the bottle 57 is sucked up into the hot water; the resulting solution of foaming agent is supplied to the foam-production vessel 68. The compressed air passing along the tube 76 then passes through the pores of the stone block 78 to form multiple small bubbles, so that foam is continuously formed at the surface of the aqueous solution, the foam flowing up and through the tubular spider 66, then flowing radially outwards between the legs of the tubular spider 66, and then flowing down the annular gap between the foam-production vessel 68 and the tube 58. Consequently the foam flows out of the open end of the tube 58 and flows down the open-topped chute 62.

In use, therefore, the weed control apparatus 50 would be held with the end of the open-topped chute 62 near the base of the weed 45 (in the same way as shown in FIG. 1), so as to enclose at least part of the weed 45 and the surrounding ground with foam 46, as indicated by the broken line in FIG. 1.

When sufficient foam has been formed, foam production is ceased; and hot water is supplied through the tube 80, so that the hot water then runs down the chute 62 and is injected through the foam 46 onto the base of the weed 45. (Where an annular nozzle structure 60 is provided, the hot water is supplied through the tube 80 to the annular nozzle structure 60 and sprays out as a water blade on to the top of the open-topped chute 62 and then runs down the chute 62.) This kills the weed 45 in the same manner as described above in relation to the weed control apparatus 10. The spraying of the hot water onto the top of the open-topped chute 62, as mentioned above, also washes off foam that might otherwise stick to the surface of the chute 62.

Figure 5:
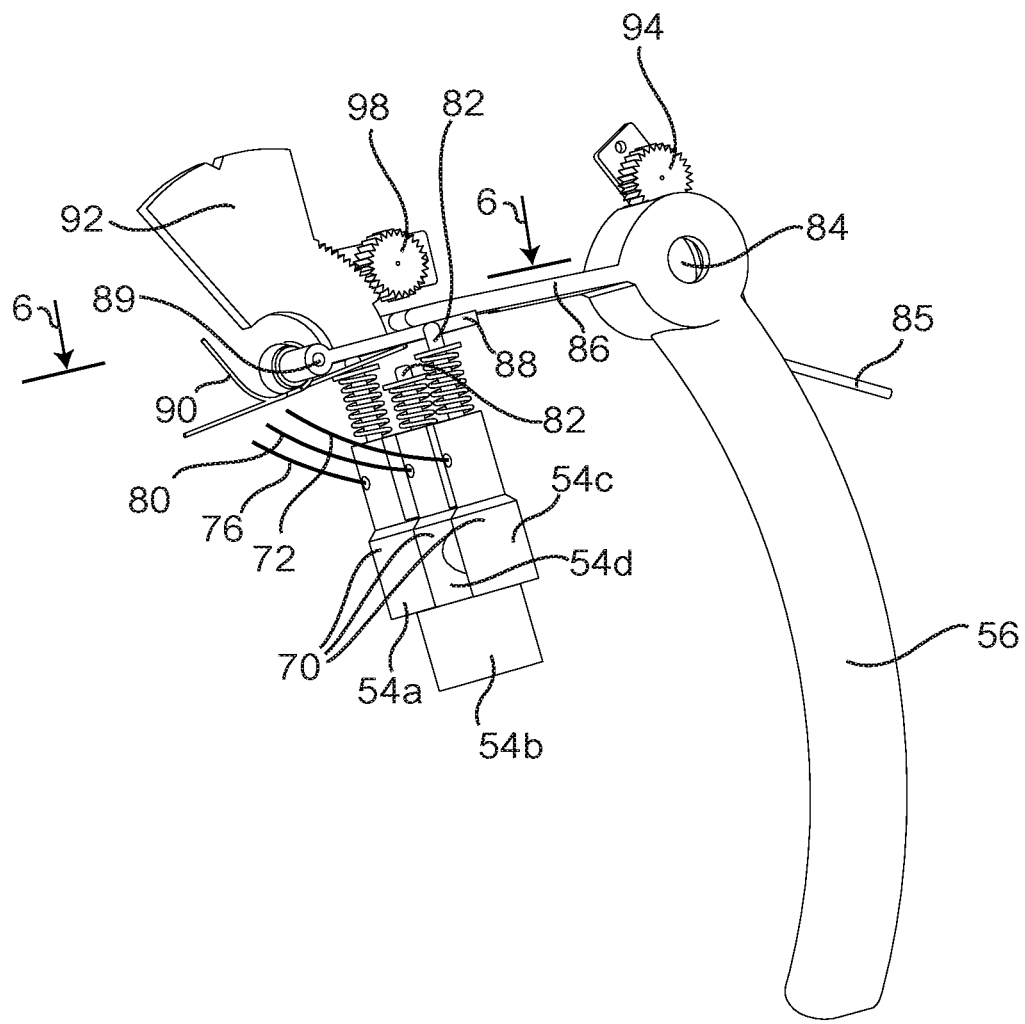
FIG. 5 shows a valve mechanism within the handle of the weed control apparatus of FIG. 3.

In the weed control apparatus 50 the control of the timing of the two steps—foam production, and then hot water dispensing—uses a mechanical approach. Referring now to FIG. 5, this shows more details of the trigger 56, and of the mechanical valves 70 associated with the inlets 54a and 54b. The hot water supplied to the inlet 54b is supplied to two adjacent inlet ports 54c and 54d. The inlet port 54c communicates through a valve 70 to the tube 72 for generating foam, while the inlet port 54d communicates through a valve 70 to the tube 80 for injecting hot water into the foam 46. Each valve 70 includes a spring-loaded plunger 82 which is biased into the position in which valve 70 is closed; the plunger 82 associated with the hot water inlet 54d is shorter than the plungers 82 associated with the compressed air and hot water inlets 54a and 54c.

Figure 6:
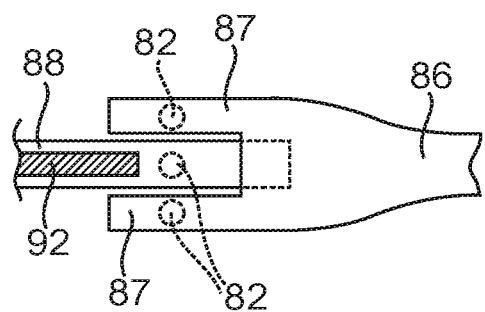
FIG. 6 shows a sectional view on the line 6-6 of FIG. 5, showing only the lever arm and the rocker plate that are associated with the valve mechanism.

The trigger 56 rotates about a pivot 84, being biased by a spring 85 into the un-squeezed position, and is integral with a lever arm 86; the end of the lever arm 86, as shown in FIG. 6, consists of two parallel prongs 87, which act on the plungers 82 of the valves 70 connected to the tube 72 and the tube 76. The underside of the lever arm 86 between the parallel prongs 87 acts on a rocker plate 88. Referring again to FIG. 5, the rocker plate 88 can turn around a pivot 89, its underside bearing against the spring-loaded plunger 82 associated with the tube 80, and is biased by a spring 90 into a position in which the valve 70 is closed. An indicator plate 92 is integral with, and projects up from, the top of the rocker plate 88; the indicator plate 92 has an arcuate top surface which is adjacent to an aperture in the handle 55, so the operator is provided with a visual indication of the status of the valves 70.

Above the pivot 84 is a rotary damper 94 to retard clockwise rotation, which engages a rim of the trigger 56. A rotary damper 98 to retard clockwise rotation is mounted so as to engage an edge of the indicator plate 92. The rotary damper 98 provides more damping than the rotary damper 94.

In operation, compressed air is supplied to the inlet 54a, and hot water is supplied to the inlet 54b, through hoses from external sources (not shown). When the operator squeezes the trigger 56, the prongs 87 of the lever arm 86 push down on the plungers 82 that open the valves 70 connected to the tube 72 and to the tube 76, so hot water flows via the inlet port 54c into the tube 72 and compressed air flows from the inlet 54a into the tube 76, so producing foam as described above. The rotary damper 94 retards this rotation, to ensure foam is produced for a sufficient period.

Squeezing the trigger 56 even further pushes the rocker plate 88 down, and this opens the valve 70 connected to the hot water inlet 54d, so hot water flows through the tube 80. Hence hot water is injected as described above into the foam 46 on and around the weed 45. When the operator releases the trigger 56, the lever arm 86 and the trigger 56 rotate under the influence of the spring 85 back into their initial position, so the valves 70 connected to the tubes 72 and 76 close, and foam production ceases. At the same time, the rocker plate 88 is pushed back up by the spring on the valve 70 on which it acts, as well as by the spring 90, but the upward motion of the rocker plate 88 is retarded by the rotary damper 98. Hence the valve 70 connected to the tube 80 remains open for a period of time after the other valves 70 have closed. This ensures that hot water is dispensed for a sufficient period, and that hot water is dispensed after foam production ceases.

It will be appreciated that the weed control apparatuses 10 and 50 described above may be modified in various ways while remaining within the scope of the present invention, as defined by the claims. For example a different way of generating foam may be utilised; and for example the aqueous solution may be supplied in the required concentration, rather than being supplied as a concentrate to be diluted during operation.

The invention claimed is:

1. A vegetation control apparatus comprising:
   a foam-generating device configured to generate a foam within an open-ended tube, comprising:
   a vessel configured to hold a foaming agent;
   a first duct configured to provide water to combine with the foaming agent to generate an aqueous solution; and
   an air supply configured to flow air over the aqueous solution;
   a foam-dispensing duct configured to dispense the foam, the foam-dispensing duct comprising an open-topped chute, so as to enable a coating of foam to be deposited on vegetation;
   a nozzle configured to inject water with a temperature of at least 60° C. into the foam so as to contact the vegetation below or within the coating of foam; and
   a second duct to supply the water to the nozzle,
   wherein the apparatus comprises a second valve connected to the second duct and a first valve connected to the first duct, wherein the second valve is configured to remain open for a period of time after the first valve has closed to ensure that the water is injected into the foam after the dispensing of foam has ceased.

2. The apparatus as claimed in claim 1 also comprising at least one damper configured to ensure a delay in the injection of the water through the nozzle until after the foam has been dispensed from the foam-dispensing duct.

3. The apparatus as claimed in claim 1 wherein the nozzle configured to inject the water is arranged to spray the water over surfaces of the foam-dispensing duct.

4. The apparatus as claimed in claim 3 wherein the nozzle is shaped to allow water to emerge as a blade.

5. The apparatus as claimed in claim 1 wherein the foam-generating device comprises a spray nozzle arranged to spray the aqueous solution into a stream of air.

6. The apparatus as claimed in claim 5 wherein the foam-generating device also comprises a mesh barrier that surrounds the spray nozzle.

7. The apparatus as claimed in claim 1 wherein the air supply is connected through an air duct to a porous block, the porous block being arranged to be immersed in the aqueous solution in a vessel from which the resulting foam can emerge.

8. The apparatus as claimed in claim 5 wherein the foam-generating device comprises a water supply connected to a water inlet duct leading via a venturi constriction to the spray nozzle, and a liquid duct communicating between a vessel to contain a concentrate comprising the surfactant and a wall of the venturi constriction, to form a mixed aqueous solution.

* * * * *